(12) United States Patent
Fay

(10) Patent No.: US 10,490,829 B2
(45) Date of Patent: Nov. 26, 2019

(54) METHOD FOR MANUFACTURING A FUEL CELL

(71) Applicant: GM GLOBAL TECHNOLOGY OPERATIONS LLC, Detroit, MI (US)

(72) Inventor: Matthew M. Fay, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/899,704

(22) Filed: Feb. 20, 2018

(65) Prior Publication Data

US 2019/0260041 A1    Aug. 22, 2019

(51) Int. Cl.
 *H01M 8/0297* (2016.01)
 *H01M 8/0286* (2016.01)

(52) U.S. Cl.
 CPC ....... *H01M 8/0286* (2013.01); *H01M 8/0297* (2013.01)

(58) Field of Classification Search
 CPC ................ H01M 8/0286; H01M 8/0297
 See application file for complete search history.

(56) References Cited

U.S. PATENT DOCUMENTS

2006/0075630 A1* 4/2006 Valentine ............ H01M 8/0297
                                                                29/623.1
2016/0301088 A1* 10/2016 Freese ................. H01M 8/0206

* cited by examiner

*Primary Examiner* — Olatunji A Godo
(74) *Attorney, Agent, or Firm* — Quinn IP Law

(57) ABSTRACT

A method for manufacturing a fuel cell includes the steps of: (1) providing a first bipolar plate and a second bipolar plate; (2) applying a first microseal to the first bipolar plate at a first metal bead seal region; (3) applying a first contaminant seal to the first microseal and the first metal bead seal region of the first bipolar plate, the first contaminant seal being configured to protect the first metal bead seal region from a debris piece; (4) assembling a UEA having a subgasket onto the first bipolar plate with a debris piece engaging with the first contaminant seal; and (5) compressing the second bipolar plate onto the first bipolar plate with the subgasket in-between while urging the first contaminant seal and the debris piece away from the first metal bead seal region. Alternatively, the first and second contaminant seals may be applied to the subgasket.

20 Claims, 10 Drawing Sheets

METHOD FOR MANUFACTURING A FUEL CELL

TECHNICAL FIELD

The present disclosure relates to a method for manufacturing a fuel cell used in a vehicle.

BACKGROUND

Fuel cells are used as an electrical power source in many applications. In particular, fuel cells are proposed for use in automobiles to replace internal combustion engines. A commonly used fuel cell design uses a solid polymer electrolyte (SPE) membrane or proton exchange membrane (PEM), to provide ion transport between the anode and cathode.

Fuel cells in general are electrochemical devices that convert the chemical energy of a fuel (hydrogen, methanol, etc.) and an oxidant (air or pure oxygen) in the presence of a catalyst into electricity, heat, and water. Fuel cells produce clean energy throughout the electrochemical conversion of the fuel. Therefore, they are environmentally friendly because of the zero or very low emissions. Moreover, fuel cells are high power systems, generating anywhere from a few watts to hundreds of kilowatts with efficiencies much higher than conventional internal combustion engines. Fuel cells also produce low noise because they have few moving parts.

In proton exchange membrane fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly (MEA) in which a solid polymer membrane has an anode catalyst on one face and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates (i.e., flow field plates). The plates function as current collectors for the anode and the cathode and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive, and gas impermeable. In typical applications, individual fuel cells are stacked in series in order to provide the required level of electrical power.

Embodiments of the conventional electrochemical cell also include hardware components, e.g., plates, for reactant flow separation, current collection, compression and cooling (or heating). A bipolar plate provides multiple functions: (a) distributes reactant flow at the anode or cathode, (b) collects electrical current from operating anode/cathode surfaces, and (c) prevents mixing or cross-over of the anode and cathode reactants in single cells. An assembly of two or more of these single cells is called a stack. A cooling plate (often integral with the bipolar plate) primarily distributes coolant flow in a stack. The number and sizing of single cells in a fuel cell stack is generally selected based on the system power requirements. For convenient assembly and/or disassembly of a fuel cell stack with large voltage or power output, multiple sub-stacks or modules, can be combined to form the stack. The modules represent stacks of single cells in some number less than what ultimately results in the completed stack, as is well understood by those of ordinary skill in the art. When the stack forms a PEM fuel cell, the stack is often referred to as a PEM stack.

In a conventional PEM stack assembly, sealing of hardware components and active cells, for effective separation of anode and cathode reactant-flows and prevention of their leakage and intermixing, is a critical technical issue with direct impact on stack performance and reliability. These factors, in addition to sealing system design and design for manufacturability have a direct impact on the overall PEM fuel cell system cost. Leakage or cross-mixing of reactants and coolant between different cells and multiple elements of a single cell is conventionally prevented by compressive or adhesive seals, which in some instances make use of elastomeric and/or adhesive materials.

With reference to FIG. 1A, microseal material 120 may be transferred to a metal bead 122 through a screen 126. The final shape of the traditional microseal 124 is controlled by bead shape (gravity), stencil design, ink viscosity, and surface energy. Unfortunately, as shown in FIGS. 1B-1C, when there is debris 146 from the substrate or the coated electrode on the metal bead 122, the metal bead 122 may buckle in region 150 where the debris 146 is located and/or the microseal material 124 may be damaged. As is known, the UEA 134 having a carbon substrate and a coated electrode is generally assembled between two bipolar plates 123. The bipolar plates 123 are generally joined at the metal bead seal region. However, despite efforts to maintain a clean environment in the assembly process, the carbon substrate and/or the coated electrode from the UEA 134 may be brittle in nature thereby generating some debris 146 which falls on the microseal 124 and metal bead 122 (FIG. 1B) in the assembly process. Such debris 146 can present issues where the metal beads 122 of the two bipolar plates 123 (FIG. 1C) are joined, seal contact is not guaranteed, especially in the regions 150 where the metal bead 122 buckles due to such debris 146. Leaks in the seals can generate overboard leaking wherein gases from the fuel cell stack are leaked into the environment. Given a set of metal properties and metal bead geometry including metal thickness specifications, it may not be possible to improve the buckling load of the metal bead sufficiently, by altering the metal form alone.

Accordingly, there is a need for a method to manufacture a fuel cell which removes debris at the metal bead seal region of the bipolar plates when the bipolar plates for a fuel cell are joined together in order to improve seal contact and increase robustness.

SUMMARY

The present disclosure provides a method for manufacturing a fuel cell which includes the steps of: (1) providing a first bipolar plate and a second bipolar plate; (2) applying a first microseal to the first bipolar plate at a first metal bead seal region; (3) applying a first contaminant seal to the first microseal and the first metal bead seal region of the first bipolar plate, the first contaminant seal may be configured to protect the first microseal and the first metal bead seal region from a debris piece; (4) assembling a UEA with a subgasket onto the first bipolar plate with a debris piece engaging with the first contaminant seal; and (5) compressing the second bipolar plate onto the first bipolar plate with the subgasket in-between while urging the first contaminant seal away from the first metal bead seal region.

Noting that the second bipolar plate may not require a contaminant seal when the first bipolar plate is laid open for the UEA to be assembled on top of the first bipolar plate, it is understood that a second contaminant seal may also be applied to the second bipolar plate. In doing so, it is understood that second bipolar plate may also generally have a second microseal at its metal bead seal region (second metal bead seal region). Under this arrangement, the second contaminant seal may also be applied to the second microseal and the second metal bead seal region of the second bipolar plate wherein the second contaminant seal is also configured to protect the second microseal and the second metal bead seal region from a debris piece. Similarly, when the second bipolar plate is attached to and/or compressed onto the first bipolar plate, the first and second contaminant seals may both be urged away from the first and second metal bead seal regions thereby enabling the first and second metal bead seal regions to contact each other, free from any undesirable debris pieces at the first and second metal bead seal regions.

Regardless of whether only the first contaminant seal is used or both the first and second contaminant seals are used at the joint between the first and second metal bead seal regions, it is understood that the material implemented in the first and/or second contaminant seals may be formed from a liquid or a gel. The first and/or second contaminant seals formed from a liquid or a gel may have a high surface tension such that the first and/or second contaminant seals can deflect any debris pieces away from the metal bead seal regions which may fall in the first and/or second metal bead seal regions. Water is an example where the first and/or second contaminant seals are formed from a liquid, given that water has a high surface tension. The high surface tension from certain liquid (such as water) or gels (such as a water-gelling agent mixture or an alcohol-gelling agent mixture) enable the first and/or second contaminant seals to deflect debris pieces from the unitized electrode assembly (UEA) which may come in the form of debris pieces from the hydrophobic carbon substrate and/or debris pieces from the coated electrode. It is understood that where a gelling agent is used, the mixture has a sufficiently high water content level to provide a sufficiently high surface tension which can deflect debris pieces.

Alternatively, the first and/or second contaminant seals may also be configured to absorb debris pieces by using a liquid or a gel having a low surface tension relative to water. A non-limiting example of a liquid having a lower surface tension would be a water-alcohol mixture. A non-limiting example of a gel may be a gelling agent with sufficient water or alcohol levels in the mixture to provide for relatively low surface tension. Noting that the first and/or second contaminant seals absorb the debris pieces within each contaminant seal, the debris pieces may then be moved away from the metal bead seal region when the first and/or second contaminant seals are urged away from the metal bead seal region. Thus, the first and/or second contaminant seals effectively carry away the debris from the first and/or second metal bead seal regions when the first and/or second contaminant seals are urged out of the metal bead seal region as the second bipolar plate is compressed onto the first bipolar plate.

In order to apply the first and/or second contaminant seals to their respective bipolar plates (first bipolar plate and second bipolar plate), a member saturated with the contaminant seal material may be used. That is, where the first and/or second contaminant seals are formed by a liquid, a liquid saturated member (such as but not limited to a sponge like member) may apply the first and/or second contaminant seals to the respective metal bead seal regions. Alternatively, where the first and/or second contaminant seals are formed by a gel, a gel saturated member (such as but not limited to a sponge like member) may apply the first and/or second contaminant seals to the respective metal bead seal regions.

In yet another embodiment, the method for manufacturing a fuel cell may include the following steps: (1) providing a first bipolar plate, a second bipolar plate, and a UEA having a subgasket with a first side and a second side; (2) applying a first contaminant seal to a first side of the subgasket and applying a second contaminant seal to a second side of the subgasket; (3) compressing the second bipolar plate onto the first bipolar plate with the subgasket in-between wherein the first and second contaminant seals are urged away from the first and second metal bead seal regions respectively. It is understood that the first contaminant and second contaminant seals may, but not necessarily, each be formed from one of a liquid and a gel.

Similar to the earlier embodiments previously described, the liquid or gel used in the first and/or second contaminant seal may have a high surface tension which deflects hydrophobic debris pieces away from the first and second sides of the subgasket. Also, it is understood that first and/or second contaminant seals (using either liquid or gel as described above) may be configured to absorb debris pieces from the UEA which fall towards the first and/or second metal bead seal regions.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1A:
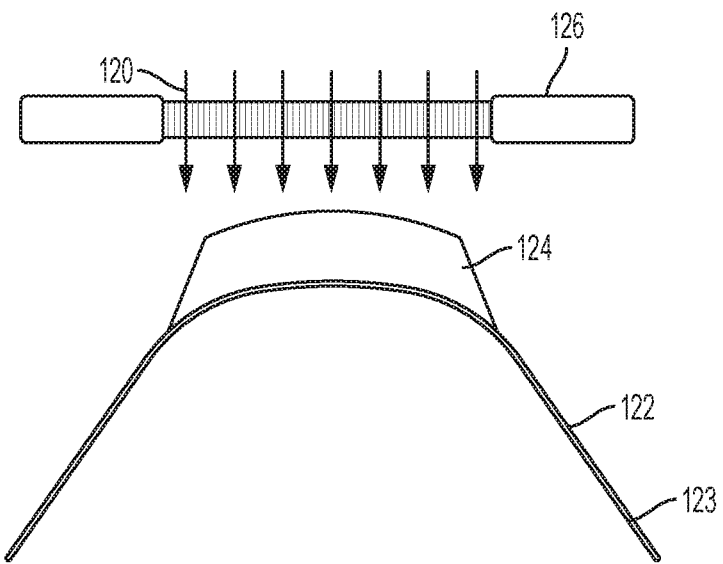
FIG. 1A is a schematic cross-sectional view of a traditional metal bead on a bipolar plate having a microseal applied to the metal bead.
Figure 1B:
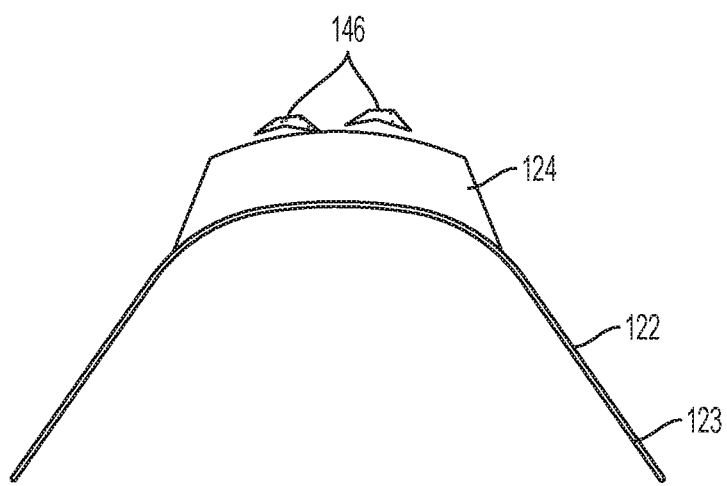
FIG. 1B is a schematic cross-sectional view of the metal bead in FIG. 1A wherein debris pieces from the UEA fall on top of the microseal and metal bead.
Figure 1C:
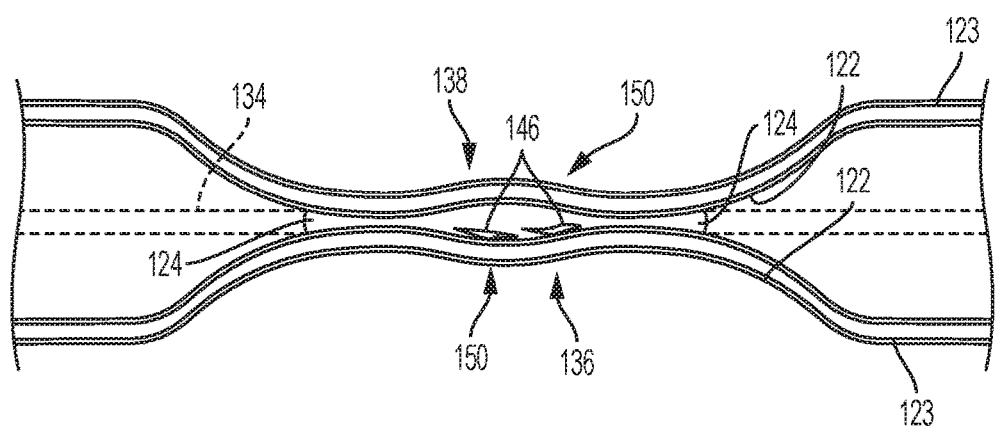
FIG. 1C is a cross-sectional view of metal bead region of FIG. 1B assembled to another bipolar plate at that bipolar plates metal bead seal region wherein the buckling condition is shown.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 2:
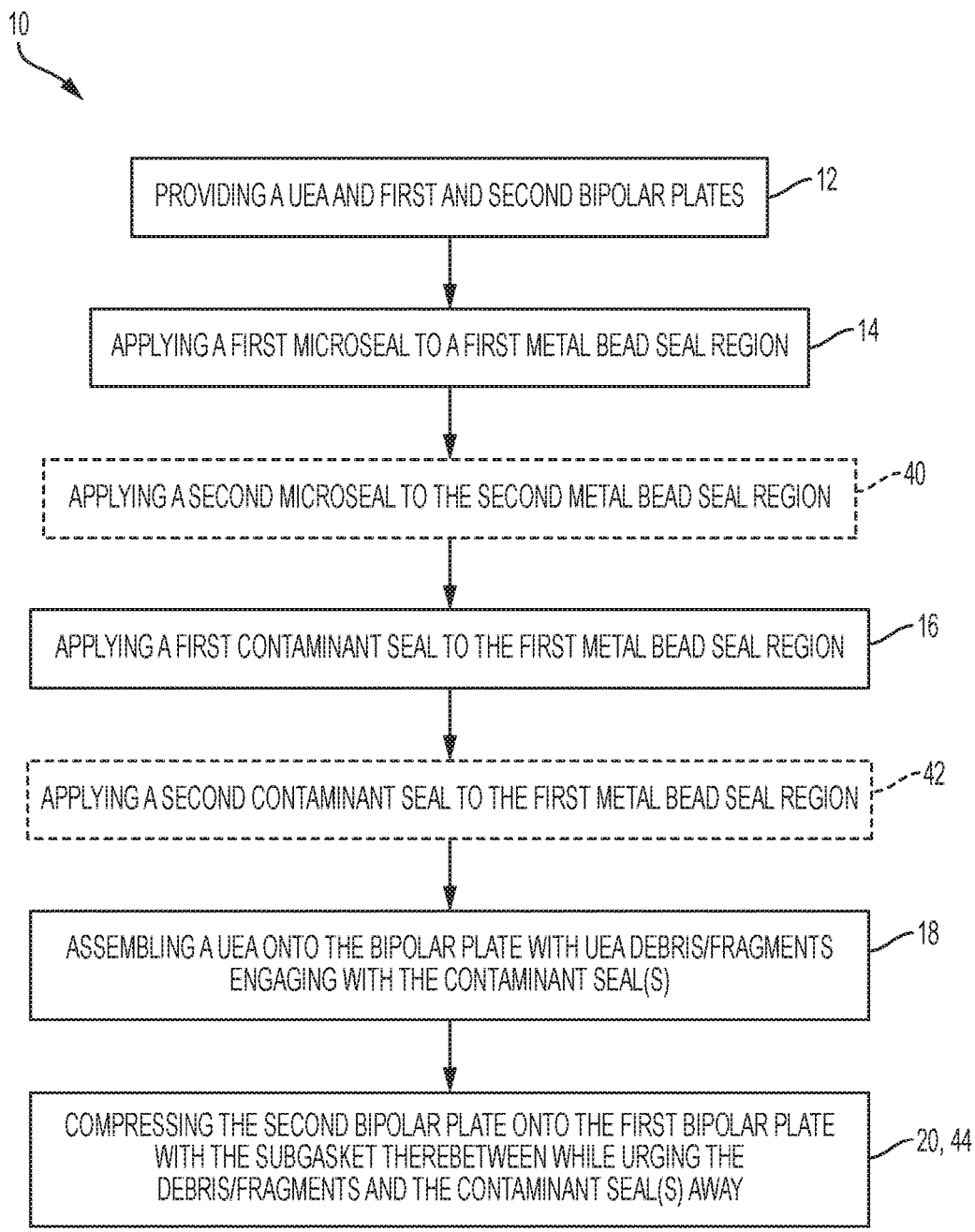
FIG. 2 is a flow chart of an example, non-limiting manufacturing method of the present disclosure.

Referring now to FIG. 2, the present disclosure provides a method 10 for manufacturing a fuel cell which includes the steps of: (1) providing a first bipolar plate 22 and a second bipolar plate 28; step 12 (2) applying a first microseal 24 to the first bipolar plate 22 at a first metal bead seal region 36; step 14 (3) applying a first contaminant seal 26 to the first microseal 24 and the first metal bead seal region 36 of the first bipolar plate 22, the first contaminant seal 26 configured to protect the first microseal 24 and the first metal bead seal region 36 from a debris piece 46; step 16 (4) assembling a unitized electrode assembly (UEA) 34 with a subgasket 35 onto the first bipolar plate 22 such that a debris 46 engages with the first contaminant seal 26; step 18 and (5) compressing the second bipolar plate 28 onto the first bipolar plate 22 with the subgasket 35 in-between while urging the first contaminant seal 26 away from the first metal bead seal region 36 step 20. The debris piece 46 which engages with the first contaminant seal may be one or more small pieces of material which may flake off the carbon substrate and/or the coated electrode of the UEA 34. When the debris 46 from carbon or debris pieces 46 from the electrode engage with the first contaminant seal 26, the debris pieces 46 may either be deflected away from the first metal bead seal region 36 (see FIG. 4A) or absorbed by the first contaminant seal 26 (see FIG. 4B) depending on the type of material used in the first contaminant seal 26 as later described in the present disclosure.

Figure 4A:
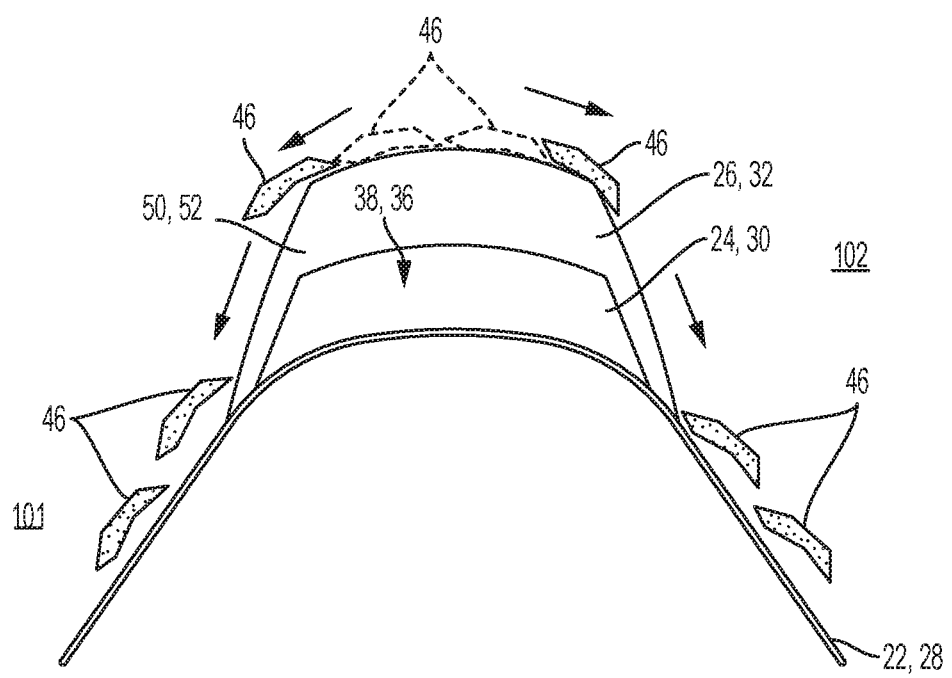
FIG. 4A is a schematic cross-sectional view a first or a second contaminant seal wherein the first or second contaminant seal is formed from a liquid or gel configured to deflect debris or debris pieces from the UEA.

Noting that the second bipolar plate 28 of the fuel cell 100 (FIG. 5A) being manufactured in the present disclosure's process may also implement its own contaminant seal (second contaminant seal 32), it is understood that a second contaminant seal 32 may be applied to the second metal bead seal region 38 of the second bipolar plate 28 (FIGS. 4A-5B). Referring to FIGS. 4A-5B, it is understood that second bipolar plate 28 may also generally have a second microseal 30 at its metal bead seal region (second metal bead seal region 38). As shown, the second contaminant seal 32 is configured to protect the second microseal 30 and the second metal bead seal region 38 from a debris piece 46 from the substrate or debris pieces 46 from the electrode (in the UEA 34) by similarly either deflecting the debris pieces as shown in FIG. 4A or absorbing the debris pieces 46 as shown in FIG. 4B.

Figure 5A:
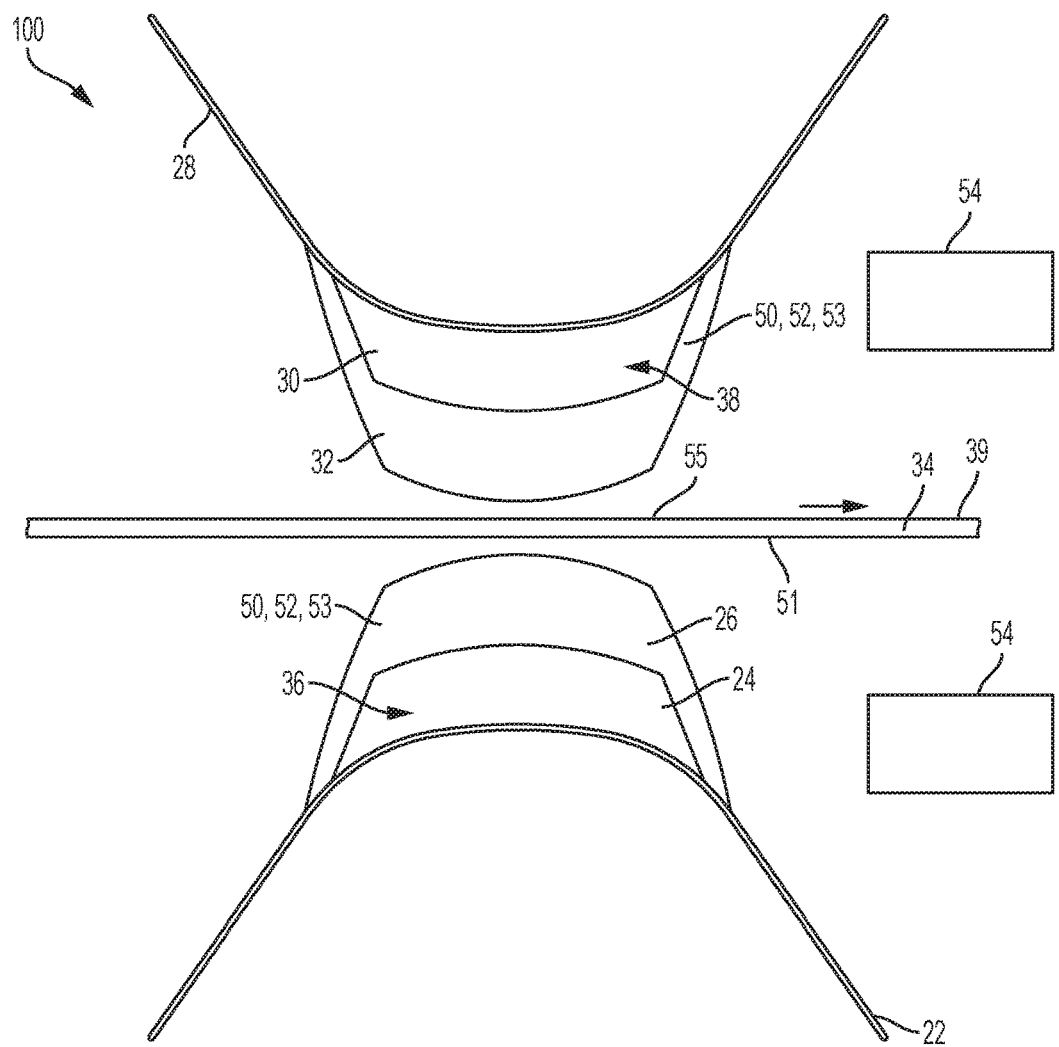
FIG. 5A is a schematic, expanded cross-sectional view an embodiment of the invention which implements both the first and second contaminant seals on the first and second bipolar plates respectively just prior to joining the first and second bipolar plates together at the metal bead seal regions.
Figure 5B:
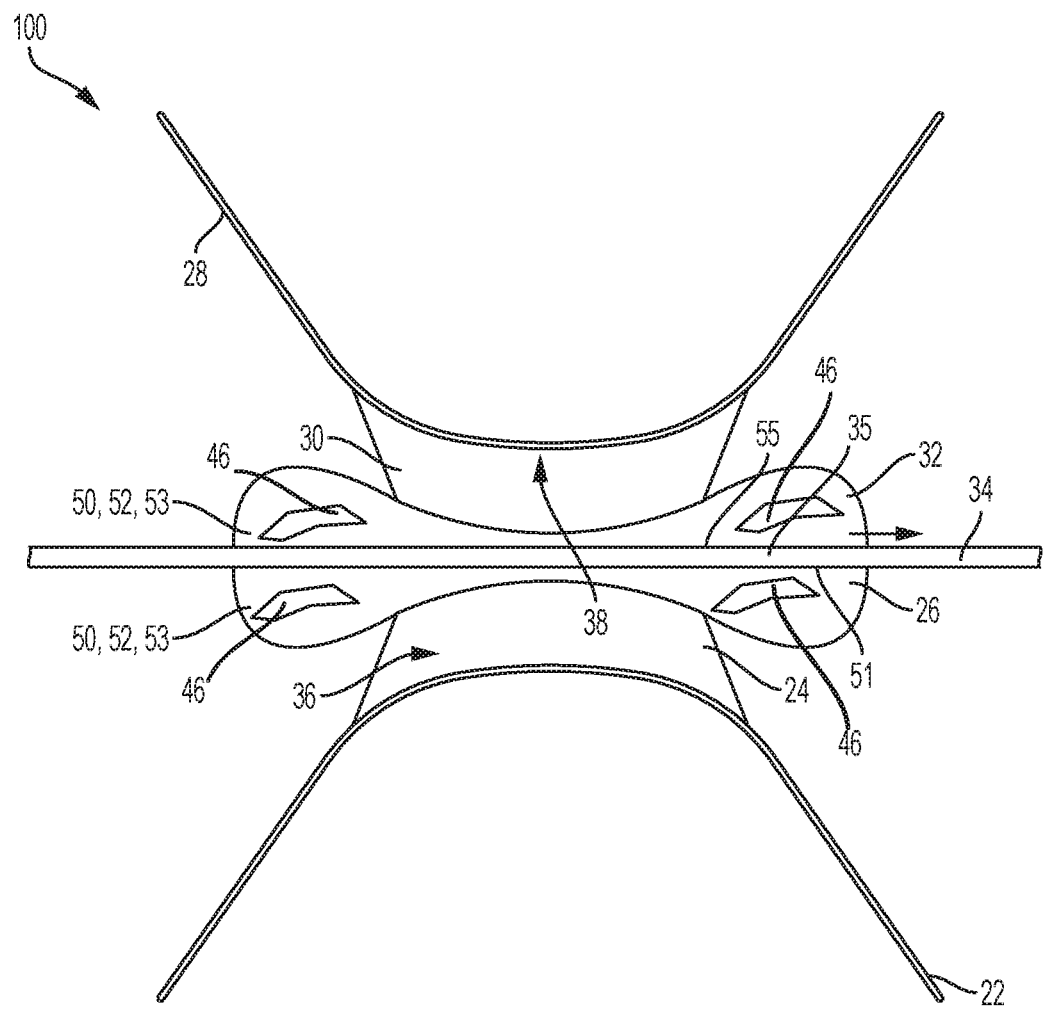
FIG. 5B is a schematic cross-sectional view an embodiment of the invention which implements both the first and second contaminant seals (or only the first contaminant seal on the first metal bead seal region) as the second bipolar plate begins to be compressed to the first bipolar plate.
Figure 6:
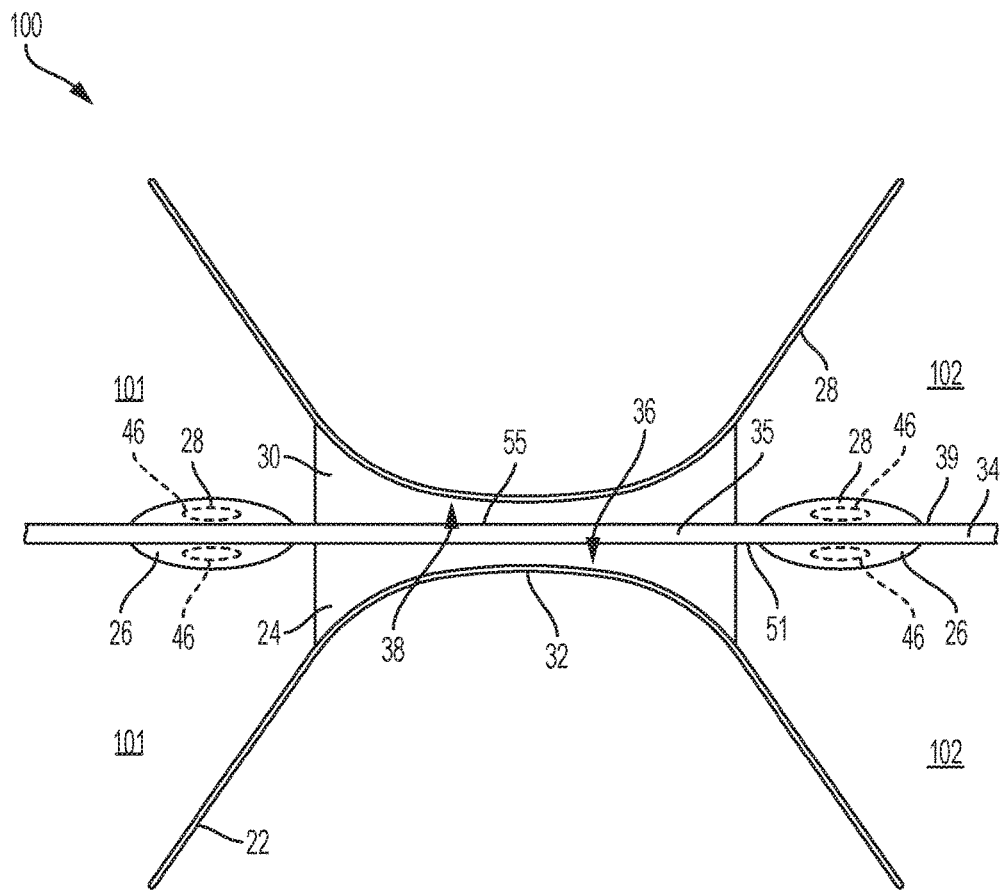
FIG. 6 a schematic cross-sectional view of the first and second metal bead seal regions of FIG. 5B wherein the first and second metal bead seal regions are completely compressed together and the first and second contaminant seals (or only the first contaminant seal if used alone) has been compressed out and away from the joint between the first and second metal bead seal regions.

Similar to the description above, it is understood that the UEA 34 is formed from brittle components such as but not limited to the carbon substrate and/or coated electrode such that small debris pieces 46 may flake off of the components of the UEA 34 when the UEA 34 is assembled to the first and second bipolar plates 22, 28. Similarly, when the second bipolar plate 28 is attached to and/or compressed onto the first bipolar plate 22, the first and second contaminant seals 26, 32 may both be urged away from the first and second metal bead seal regions 36, 38 (FIGS. 5B and 6) by the subgasket 35 disposed therebetween when the first and second bipolar plates are compressed together. The first side 51 of the subgasket 35 urges the first contaminant seal 26 away from the first metal bead seal region 36 while the second side 55 of the subgasket 35 urges the second contaminant seal 32 away from the second metal bead seal region 38. This method 10 which uses first and second contaminant seals enables the first and second metal bead seal regions 36, 38 to have continuous contact through the subgasket 35 which is free from any debris pieces 46 at the first and second metal bead seal regions 36, 38—as shown in FIG. 6.

With reference to FIG. 4A, it is understood that the material implemented in the first and/or second contaminant seals 26, 32 may be configured to deflect debris pieces 46 from the first and/or second metal bead seal regions 26, 32. The first and/or second contaminant seals 26, 32 which deflects debris may be formed from a liquid 50 or a gel-like material 52. A non-limiting example where such first and/or second contaminant seals 26, 32 are formed from a liquid 50, water 50 may be used given that water 50 has a high surface tension. The high surface tension from a liquid 50 such as water enables the first and/or second contaminant seals 26, 32 to deflect debris pieces 46 which may come from the hydrophobic carbon substrate (not shown) of the UEA and/or from the coated electrode (not shown) in the UEA 34. Due to the hydrophobic nature of the carbon material, the debris pieces 46 from the UEA 34 would move to the side region 101 of the metal bead seal region 36 opposite from the active area or to the side region 102 which is toward the active area region of the UEA 34 (see FIGS. 4A and 6). The debris pieces 46 which are transferred to side region 102 which is proximate to the active area of the UEA 34 (shown in FIGS. 4A and 6) are eventually transported outside of the fuel cell 100 via the reactant gases which flow from the inlet (not shown) of the fuel cell 100 to the outlet (not shown) of the fuel cell 100 when the fuel cell 100 is in operation.

Figure 4B:
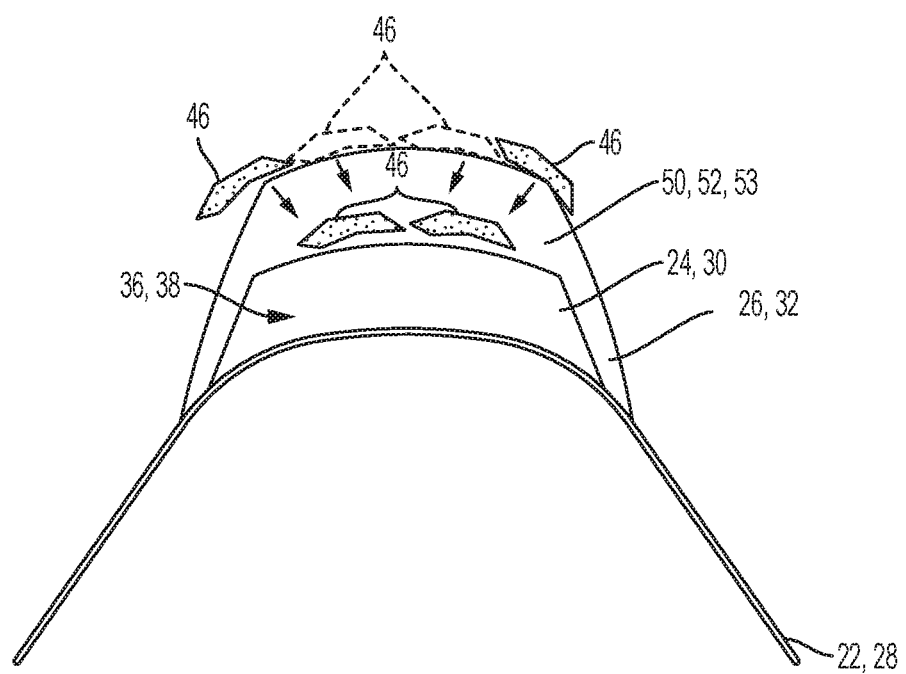
FIG. 4B is a schematic cross-sectional view a first or a second contaminant seal wherein the first or second contaminant seal is formed from a liquid or gel configured to absorb debris or debris pieces from the UEA.

Alternatively, with reference to FIG. 4B, the first and/or second contaminant seals 26, 32 may be configured to absorb debris pieces 46 generated during the assembly process. In doing so, the first and/or second contaminant seals 26, 32 may be formed from a liquid 50 or gel 52 (gel-like substance). The liquid 50 or gel 52 should implement material having a relatively low surface tension compared to water. A non-limiting example gel 52 may be a water-gelling agent mixture or an alcohol-gelling agent mixture such that the components in the mixture provide for a relatively lower surface tension (compared to water) such that the gel mixture 52 may absorb debris pieces 46. Another non-limiting example for a gel may be gelatin as long as the gelatin meets the lower surface tension criteria just described. A non-limiting example liquid may be a liquid-and-alcohol mixture 53 such that the combination has a relatively low surface tension. Given that the surface tension for the liquid or gel under this embodiment would be relatively low, the first and/or second contaminant seals absorb the debris pieces 46 from the UEA 34. Noting that the first and/or second contaminant seals 26, 32 in this arrangement may absorb the debris pieces 46 within each contaminant seal 26, 32, the debris pieces 46 are then moved away from the respective metal bead seal regions 36, 38 when the first and/or second contaminant seals 26, 32 are urged away from the metal bead seal region 36, 38. Thus, the first and/or second contaminant seals 26, 32 effectively carry away the debris pieces 46 from the first and/or second metal bead seal regions 36, 38 when the first and/or second contaminant seals 26, 32 are urged out and away from the metal bead seal regions 36, 38 as the second bipolar plate 28 is compressed onto the first bipolar plate 22 with the subgasket 35 in-between. As shown in FIG. 5B, the first side 51 of the subgasket 35 urges the first contaminant seal 26 away from the first metal bead seal region 36 while the second side 55 of the subgasket 35 urges the second contaminant seal 32 away from the second metal bead seal region 38 when the bipolar plates 22, 28 are compressed together with the subgasket 35 therebetween.

Figure 7:
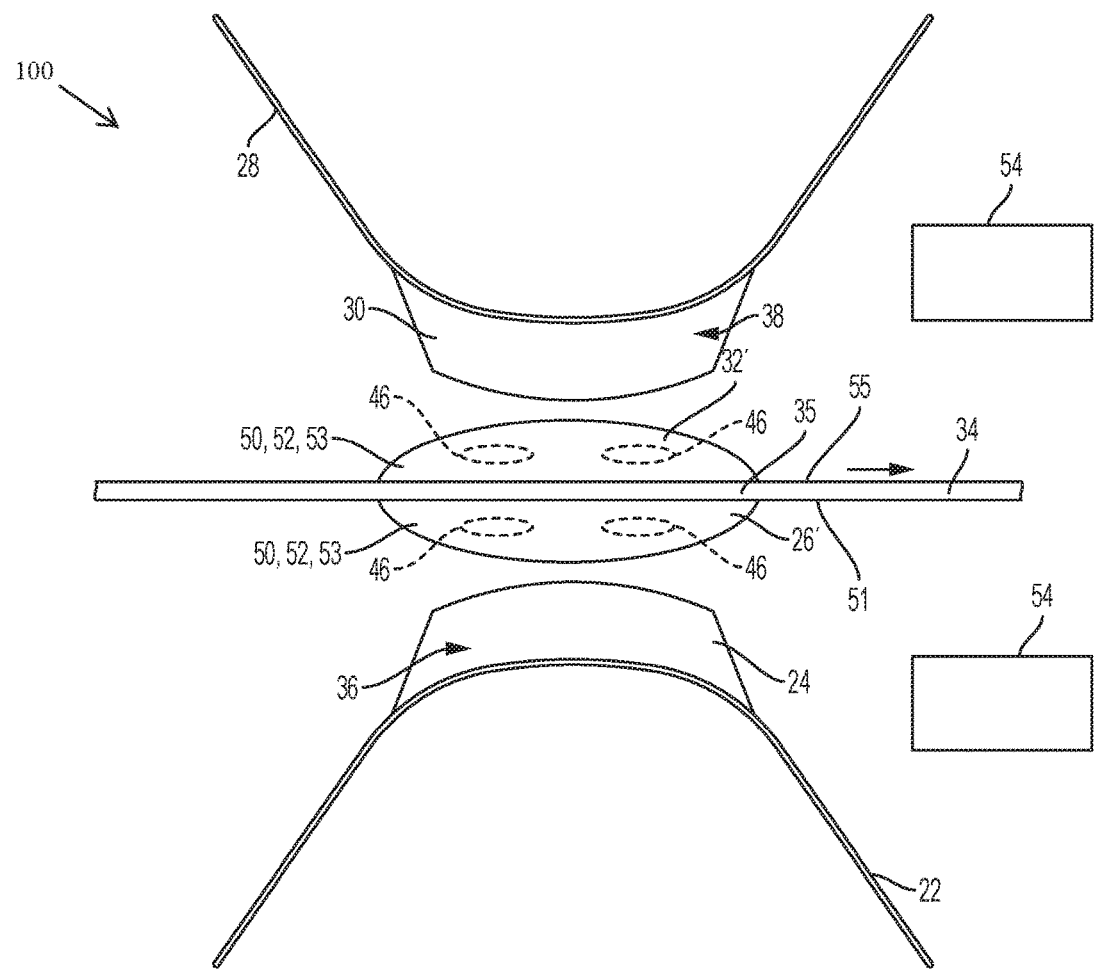
FIG. 7 is a schematic, expanded cross-sectional view of the first and second metal bead seal regions together with the UEA subgasket having first and second contaminant seals.

In order to apply the first and/or second contaminant seals 26, 32 to their respective bipolar plates (first bipolar plate 22 and second bipolar plate 28 in FIG. 5A) or to the subgasket 35 (FIG. 7) later described herein, a member 54 saturated with the contaminant seal material may be used. The member 54 may be, but not be limited to a sponge-like member. That is where the first and/or second contaminant seals 26, 32 are formed by a liquid 50, member 54 is saturated with liquid 50 (such as a sponge like member) so that the liquid saturated-member 54 may apply the first and/or second contaminant seals 26, 32 to the respective metal bead seal regions 36, 38. Alternatively, where the first and/or second contaminant seals 26, 32 are formed by a gel 52, the member 54 may be saturated with gel (such as but not limited to a sponge-like member) so that the gel saturated member 54 may apply the first and/or second contaminant seals 26, 32 to their respective metal bead seal regions 36, 38 as shown in FIG. 5A or to the subgasket 35 (FIG. 7) as later described herein.

Figure 3:
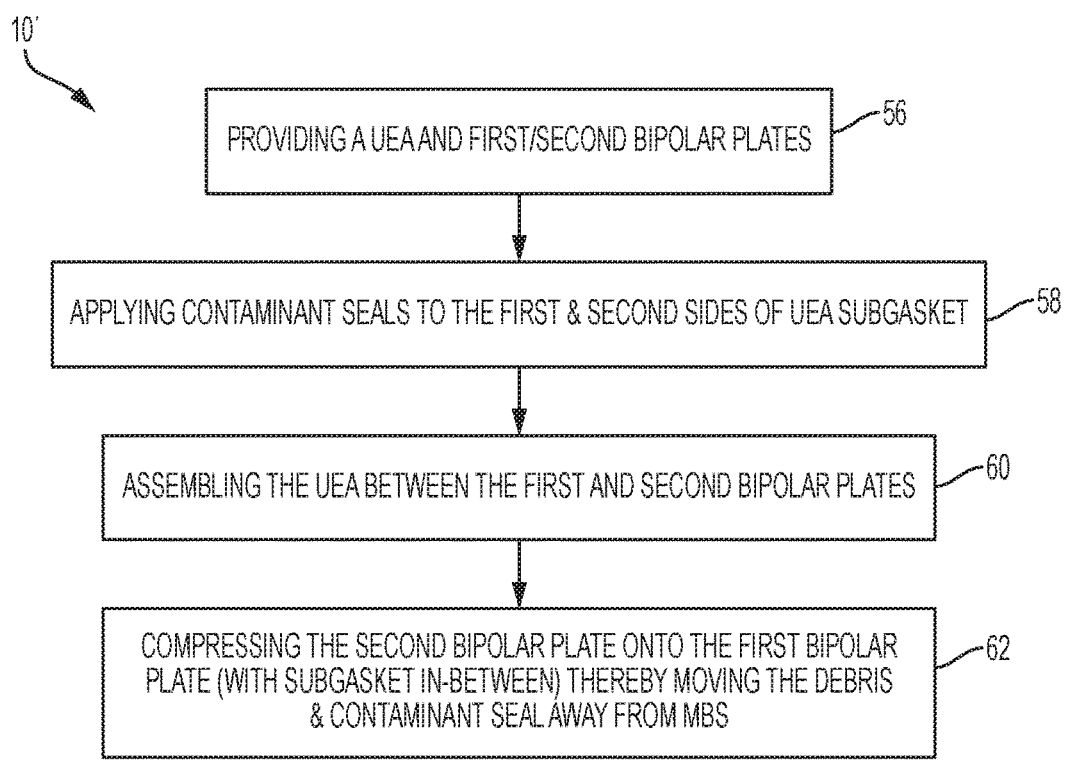
FIG. 3 is a flow chart of another example, non-limiting manufacturing method of the present disclosure.

In yet another example, non-limiting embodiment of the present disclosure as shown in FIG. 3, another method 10' for manufacturing a fuel cell may include the following steps: (1) providing a first bipolar plate, a second bipolar plate, and a UEA having a subgasket with a first side and a second side; 56 (2) applying a first contaminant seal to a first side of the subgasket and applying a second contaminant seal to a second side of the subgasket; 58 (3) assembling the UEA between the first and second bipolar plates; 60 and (4) compressing the second bipolar plate onto the first bipolar plate with the subgasket in-between wherein the first and second contaminant seals are urged away from the first and second metal bead seal regions respectively 62. It is understood that the first contaminant and second contaminant seals may, but not necessarily, each be formed from one of a liquid and a gel. Referring again to FIG. 7, the first and second contaminant seals 26', 32' are shown on the subgasket 35 wherein the first contaminant seal 26' is applied to a first side 51 of the subgasket 35 and the second contaminant seal 32' is applied to a second side 55 of the subgasket 35.

As previously described, the first and/or second contaminant seals may be formed from a liquid 50 or a gel 52 may have a high surface tension which deflects hydrophobic debris pieces 46 away from the first and second sides of the subgasket 51, 55. Alternatively, as previously described, the first and/or second contaminant seals may be formed from a liquid or a gel having a relatively low surface tension such that the first and/or second contaminant seals 26', 32' may absorb debris pieces 46 from the UEA which fall towards the first and/or second metal bead seal regions 36, 38.

While example embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing a fuel cell, the method comprising the steps of:
    providing a first bipolar plate and a second bipolar plate;
    applying a first microseal to the first bipolar plate at a first metal bead seal region;
    applying a first contaminant seal to the first microseal and the first metal bead seal region of the first bipolar plate, the first contaminant seal being configured to protect the first microseal and the first metal bead seal region from a debris;
    assembling a unitized electrode assembly having a subgasket onto the first bipolar plate with the debris from the unitized electrode assembly engaging with the first contaminant seal; and
    compressing the second bipolar plate onto the first bipolar plate with the subgasket in-between while urging the first contaminant seal away from the first metal bead seal region.

2. The method for manufacturing a fuel cell as defined in claim 1, further comprising the steps of:
    applying a second microseal to the second bipolar plate at a second metal bead seal region;
    applying a second contaminant seal to the second microseal and the second metal bead seal region of the second bipolar plate, the second contaminant seal being configured to protect the second microseal and the second metal bead seal from the debris; and
    urging the second contaminant seal away from the second metal bead seal region when the second bipolar plate is compressed onto the first bipolar plate.

3. The method for manufacturing a fuel cell as defined in claim 1, wherein the first contaminant seal deflects the debris away from the first metal bead seal region.

4. The method for manufacturing a fuel cell as defined in claim 1, wherein the first contaminant seal absorbs the debris within the first contaminant seal, and removes the debris from the first metal bead seal region when the first contaminant seal is urged away from the first metal bead seal region.

5. The method for manufacturing a fuel cell as defined in claim 2, wherein the first contaminant seal and the second contaminant seal deflect the debris away from the first metal bead seal region and the second metal bead seal region respectively.

6. The method for manufacturing a fuel cell as defined in claim 2, wherein the first contaminant seal and the second contaminant seal absorb the debris within the first contaminant seal and the second contaminant seal respectively, and the first contaminant seal and the second contaminant seal are configured to remove the debris from the first metal bead seal region and the second metal bead seal region when the first contaminant seal and the second contaminant seal are urged away from the first metal bead seal region and the second metal bead seal region.

7. The method for manufacturing a fuel cell as defined in claim 3, wherein the first contaminant seal is one of a liquid and a gel.

8. The method for manufacturing a fuel cell as defined in claim 4, wherein the first contaminant seal is one of a liquid and a gel.

9. The method for manufacturing a fuel cell as defined in claim 5, wherein the first contaminant seal and the second contaminant seal are each one of a liquid and a gel.

10. The method for manufacturing a fuel cell as defined in claim 6, wherein the first contaminant seal and the second contaminant seal are each one of a liquid and a gel.

11. The method for manufacturing a fuel cell as defined in claim 1, wherein the first contaminant seal is water.

12. The method for manufacturing a fuel cell as defined in claim 2, wherein the first contaminant seal and the second contaminant seal are each water.

13. The method for manufacturing a fuel cell as defined in claim 1, wherein the first contaminant seal is a water-gelling agent mixture.

14. The method for manufacturing a fuel cell as defined in claim 2, wherein the first contaminant seal and the second contaminant seal are each a water-gelling agent mixture.

15. The method for manufacturing a fuel cell as defined in claim 1, wherein the first contaminant seal is a gel being one of a water-gelling agent mixture and an alcohol gelling agent mixture.

16. The method for manufacturing a fuel cell as defined in claim 2, wherein the first contaminant seal and the second contaminant seal are each a gel being one of a water-gelling agent mixture and an alcohol gelling agent mixture.

17. The method for manufacturing a fuel cell as defined in claim 1, wherein one of a liquid-saturated member and a gel-saturated member applies the first contaminant seal to the first bipolar plate.

18. The method for manufacturing a fuel cell as defined in claim 2, wherein one of a liquid-saturated member and a gel-saturated member applies the first contaminant seal to the first bipolar plate and the second contaminant seal to the second bipolar plate.

19. A method for manufacturing a fuel cell, the method comprising the steps of:
    providing a first bipolar plate, a second bipolar plate, and a unitized electrode assembly having a subgasket with a first side and a second side;
    applying a first contaminant seal to the first side of the subgasket;
    applying a second contaminant seal to the second side of the subgasket, the first contaminant seal and the second contaminant seal being configured to protect a first metal bead seal region of the first bipolar plate and a second metal bead seal region of the second bipolar plate respectively from debris;

assembling the unitized electrode assembly between the first bipolar plate and the second bipolar plate; and compressing the second bipolar plate onto the first bipolar plate with the subgasket in-between, wherein the first contaminant seal, the second contaminant seal and the debris are urged away from the first metal bead seal region and the second metal bead seal region.

20. The method of manufacturing a fuel cell as defined in claim 19, wherein the first contaminant seal and the second contaminant seal are each formed from one of a liquid and a gel.

* * * * *